J. P. IMIG.
FARM GATE.
APPLICATION FILED JAN. 4, 1910.
954,296.
Patented Apr. 5, 1910.
3 SHEETS—SHEET 1.
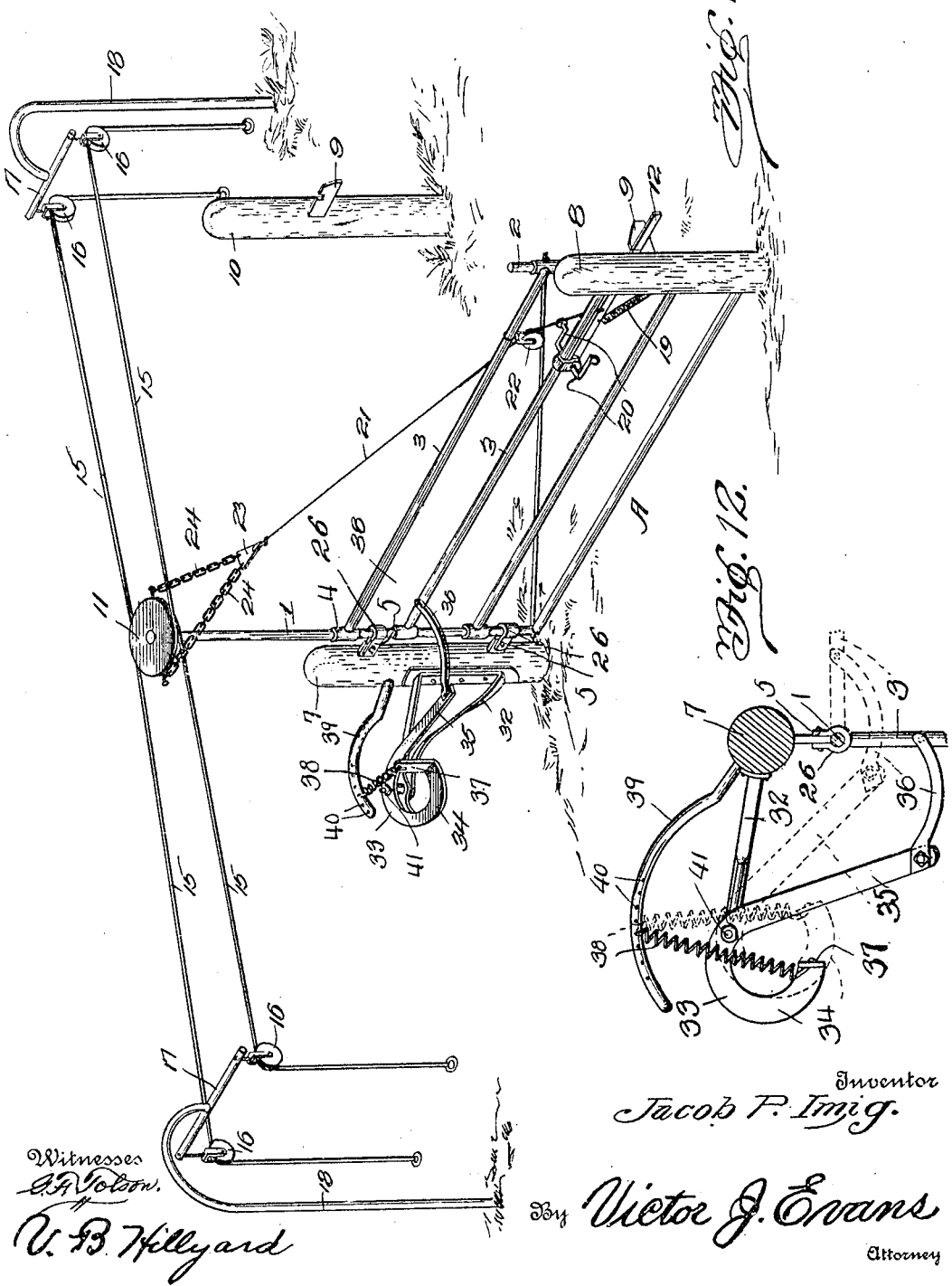
Inventor
Jacob P. Imig.
Witnesses
By Victor J. Evans
Attorney

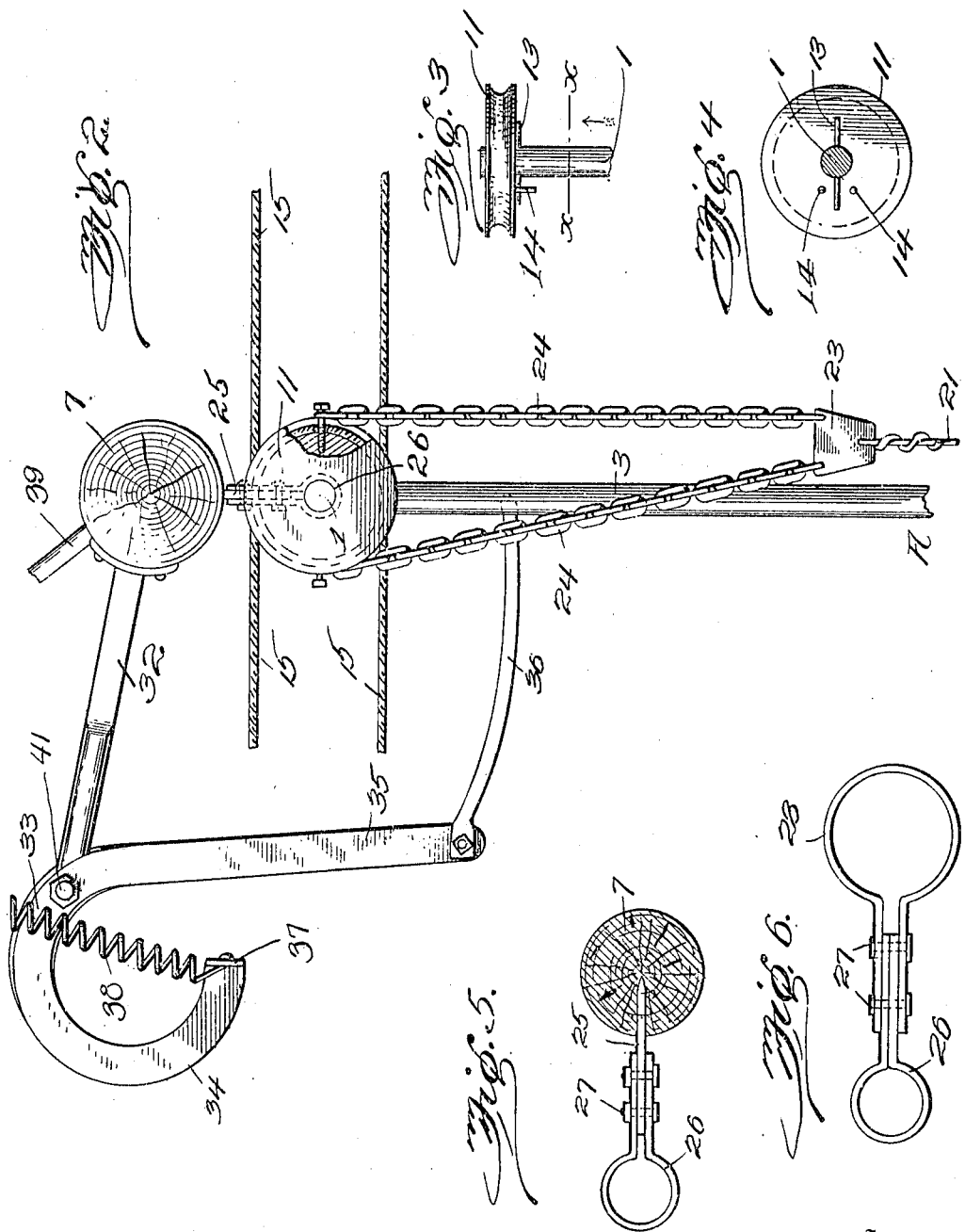

J. P. IMIG.
FARM GATE.
APPLICATION FILED JAN. 4, 1910.
954,296.
Patented Apr. 5, 1910.
3 SHEETS—SHEET 3.
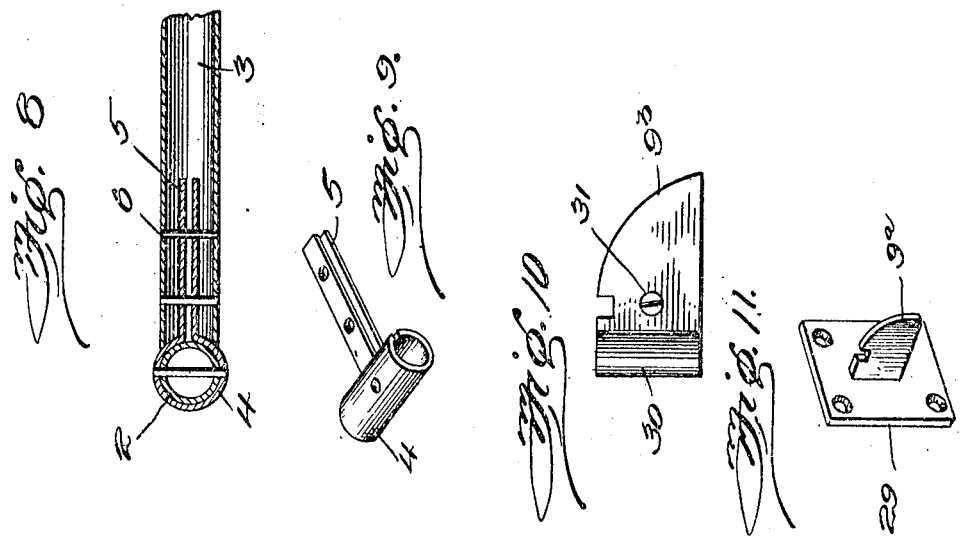
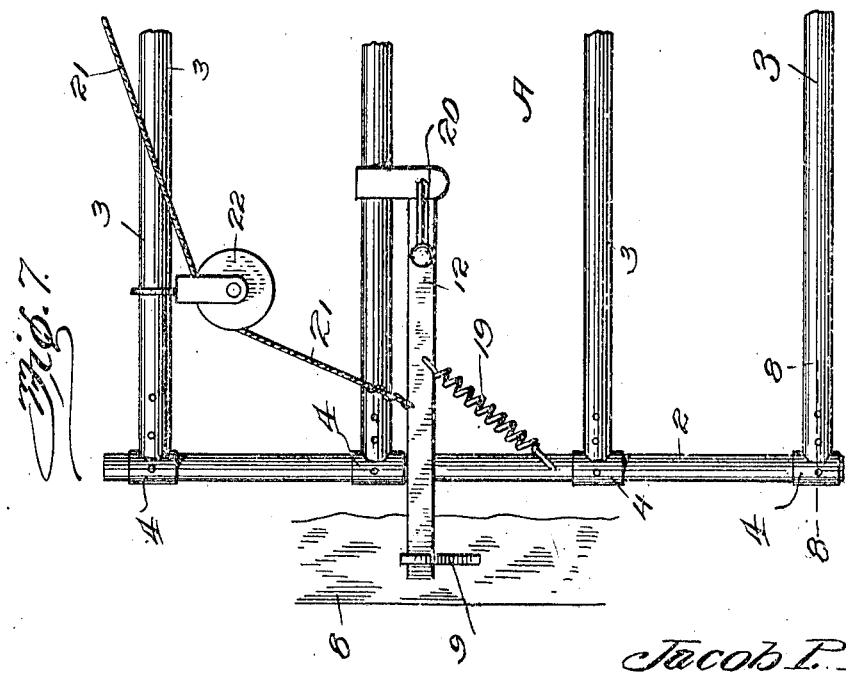

UNITED STATES PATENT OFFICE.

JACOB P. IMIG, OF SAN JOSE, ILLINOIS.

FARM-GATE.

954,296.  Specification of Letters Patent.  Patented Apr. 5, 1910.

Application filed January 4, 1910. Serial No. 536,268.

*To all whom it may concern:*

Be it known that I, JACOB P. IMIG, a citizen of the United States, residing at San Jose, in the county of Mason and State of Illinois, have invented new and useful Improvements in Farm-Gates, of which the following is a specification.

The present invention belongs to the class of gates for closing openings in fencing through which roadways extend and which are adapted to be opened at a distance from the fencing and also to be closed at a distance from the opening after passing through the same.

The purpose of the invention is the provision of novel mountings whereby the gate may be actuated in its movements with ease and certainty and whereby the strain incident to opening and closing of the gate is reduced to the smallest amount possible, thereby facilitating the operation of the gate and prolonging the period of usefulness of the gate.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a perspective view of a gate embodying the invention, showing the relation of the parts when the gate is closed. Fig. 2 is a top plan view of the rear portion of the gate and mountings, showing the parts on a larger scale. Fig. 3 is a view in elevation of the upper end of the rod provided at the inner or hinge end of the gate, showing the grooved pulley mounted thereon. Fig. 4 is a section on the line x—x of Fig. 3 looking upward, as indicated by the arrow. Fig. 5 is a horizontal section of the post to which the gate is hinged, showing the hinge member secured thereto in which the gate is mounted to swing. Fig. 6 is a top plan view of a modified form of gate hinge. Fig. 7 is a view in elevation of the outer end of the gate and a portion of the latch post, showing the parts on a larger scale. Fig. 8 is a horizontal section on the line 8—8 of Fig. 7, showing the parts on a larger scale. Fig. 9 is a detail view in perspective of the connector between the outer rod of the gate and the horizontal members. Fig. 10 is a side view of a form of stop designed to be applied to a round latch post. Fig. 11 is a perspective view of a form of stop to be applied to a wooden latch post. Fig. 12 is a detail view, showing the relation of the parts both by full and dotted lines when the gate is closed and open.

Corresponding and like parts are referred to in the following description, and indicated in all the views of the drawings, by the same reference characters.

The gate is designated by the letter A and so far as the mountings are concerned may be of any construction. As shown the gate in its specific formation comprises end rods 1 and 2 and horizontal rods or members 3. The several parts may be secured in any manner. The parts 1, 2, and 3 consist of lengths of tubing and are joined by connectors each comprising a sleeve 4 and straps 5. The connectors are formed of blanks, which are struck up from sheet metal, the middle portion of the blanks being wide and when bent forming the sleeve 4 and the end portions being narrow and constituting the straps 5, which latter enter the ends of the horizontal members 3 and are secured thereto by rivets or analogous fastenings 6. The sleeves 4 of the connectors embrace the vertical rods 1 and 2, as indicated most clearly in Figs. 1, 7 and 8.

At one side of the opening is arranged a hinge post 7 and at the opposite side is located a latch post 8, which receives a stop 9. A post 10 is located upon the same side of the roadway or opening as the post 7 and is provided with a stop 9 to engage the latch of the gate and hold the latter when swung open. The gate is mounted to swing open in one direction only. The rod 1 at the inner or hinge end of the gate is extended upwardly and is provided at its upper end with a grooved pulley 11, which has a limited play upon the rod 1 to admit of disengagement of the latch 12 from the stop 9 preliminary to the application of force for swinging the gate open or shut. Any means may be employed to admit of the pulley 11 having a limited play. As shown most clearly in Figs. 3 and 4 the rod 1 is provided with a pin 13 and the pulley is supplied with a pair of pins 14 between which the pin 13 operates. The movement or play between the pins 13 and 14 is sufficient to effect disengagement of the latch 12 from the stop 9, after which the pin 13 engages with one of the pins 14 and applies the power to the rod 1 exerted for swinging the gate open or shut. Operating cords, wires, or chains 15 have connection at one end with the pulley 11 and their opposite ends extend within convenient reach at a suitable distance from the gate at either approach to admit of the same being swung open or closed without requiring a person mounted or riding to dismount, the operating ends of the cord or connections 15 passing over sheave pulleys 16 applied to cross bars 17 attached to the upper ends of posts 18. A pair of cords or connections 15 are provided for each side of the gate and one cord of each pair serves to effect an opening of the gate and the other cord to close the gate, as will be readily understood. The posts 18 are located upon the same side of the gate opening as the hinge post 7 and latch post 10 and are placed a sufficient distance from the gate to insure an opening or a closing thereof.

The latch 12 consists of a bar and is mounted upon the gate in any manner to swing in the plane thereof, so as to engage with either of the stops 9 or become disengaged therefrom. A spring 19 normally holds the latch 12 in engagement with the stop or in position to engage with either of the stops accordingly as the gate is swung open or closed. Cranks 20 project from opposite sides of the latch and have connection therewith to admit of the latch being operated by hand from either side of the gate. A cord, wire, or chain 21 is connected at one end to the latch 12 and passes over a sheave pulley 22 near the top of the gate near the swinging end thereof and passes upwardly and rearwardly and is attached to a plate or link 23. Chains or like connections are attached to the plate or link 23 at their outer ends and have their rear ends fastened to the pulley 11 at diametrically opposite points in such position as to insure a pull upon either one of the connections 24 and the connection 21 and latch 12, whereby the latter is released from the stop upon exerting a pull upon the operating end of either one of the cords or connections 15 provided to effect an opening of the gate. After the gate has been swung open a pull upon the other cord or connection 15 effects a closing thereof, as will be readily understood herein.

The gate may be hinged to the post 7 in any manner. As shown in Figs. 1, 2 and 5 a flattened spike 25 is driven into the post 7 and receives the ends of a strap 26, which latter is doubled upon itself and is formed into an eye at the fold to receive the rod 1, the end portions of the strap being brought together upon opposite sides of the spike 25 and secured thereto by fastenings 27. In the construction shown in Fig. 6 a strap 28 is formed in a manner similar to the strap 26, so that its middle portion may encircle an iron post, the end portions of the strap being brought together and secured by fastenings 27, which latter serve to draw the eye or encircling portion of the strap 28 close about the post to which it may be fitted.

The stop 9 may consist of a flattened spike driven into either of the posts 8 or 10, the projecting portion of the spike having a notch in its upper edge to receive the latch 12 and having a bevel portion for said latch to ride upon. As shown in Fig. 11 the stop $9^a$ is provided with a base plate 29, which is provided with openings to receive screws or other fastenings for attaching the same to a side of a wooden post. The form of stop shown in Fig. 10 is constructed of a strip of sheet metal doubled upon itself and having a sleeve 30 at the fold, the end portions being brought together to form a stop $9^b$ and being secured by means of a fastening 31. This form of stop may be clamped about an iron post, similar to the strap 28.

A bracket 32 is secured to a side of the hinge post 7 and projects therefrom in a direction opposite to that in which the gate swings. A lever 33 is mounted pivotally at 41 upon the outer end of the bracket 32 and comprises an approximately semicircular end 34 and a straight arm 35. A link 36 pivotally connects the outer end of the arm 35 with the gate, said link 36 and arm 35 forming in effect toggle levers. A vertical extension 37 projects from the extremity of the curved portion 34 of the lever 33 and a spring 38 connects the upper end of the vertical extension 37 with an arm 39 extended from the hinge post 7, said spring being of the helical type and serving both to hold the gate open or closed. The arm 39 is curved in its length and provided with a series of openings 40, whereby the outer end of the spring 38 may be adjustably connected thereto to secure the desired result. When the gate is closed the spring 38 exerts a pulling force upon the lever 35 outside of the pivotal connection 41 of the said lever 35 with the bracket 32, as indicated by the full lines in Fig. 12. When the gate is open the spring 38 exerts a pulling force, on the curved end of the lever 35 inside a straight line passing through the pivot support 41 of said lever and the points of connection of the spring 38 with the lever 35 and arm 39, as indicated by the dotted lines in Fig. 12. Upon opening the gate the lever 35 connected therewith is moved to carry the spring 38 past the pivot support 41 of the lever nearer the post 7 and after the spring 38 passes the point 41 said spring tends to throw the gate open. Upon closing the gate the lever 35 is moved so as to carry the spring 38 beyond the pivot support 41 of the lever 35 away from the post 7 and after said spring 38 passes the point 41 it exerts a force to close the gate.

In practice a gate embodying the invention is normally held closed by the tension of the spring 38 and the latch 12. To open the gate from either approach the proper operating cord or connection 15 is pulled upon. The initial application of force to the operating connection 15 turns the pulley 11 upon the rod 1 and effects a release of the latch 12, after which a continued pull upon the connection 15 causes the gate to swing open assisted by the tension of the spring 38, the gate being held in opened position by engagement of the latch 12 with the stop applied to the post 10. To close the gate the other connection 15, upon either side of the gate, is pulled upon, the initial pull serving to effect disengagement of the latch 12 from the stop of the post 10 and a continued pull carrying the gate to a point when it will be closed by the action of the spring 38, the speed of the gate when closing being controlled by regulating the pull upon the operating cord or connection 15.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In combination hinge and latch posts arranged upon opposite sides of a gate opening, a gate mounted upon the hinge post to swing open in one direction and adapted to close against the latch post, operating means for swinging the gate open and shut, a bracket extended from the hinge post in an opposite direction to that from which the gate swings open, a lever mounted upon said bracket and having an end portion of substantially semicircular form, and having its other end portion straight, a contractile helical spring connecting the end of the curved portion of the lever with said gate and normally exerting a force to hold the gate closed, and a link pivotally connecting the arm of said lever with the gate, said link and lever arm forming in effect toggle levers.

2. In combination hinge and latch posts arranged upon opposite sides of a gate opening, a gate hinged at one end to the hinge post and adapted to close at its opposite end against the latch post and to swing open in one direction only, operating means for swinging the gate open and shut, a bracket extended from the hinge post in an opposite direction to that from which the gate extends when open, a lever mounted upon the outer end of said bracket and comprising a straight arm and an approximately semicircular end terminating in a vertical extension, a link connecting the outer end of the arm with the gate, and a contractile helical spring connecting the vertical extension of the lever with said gate.

In testimony whereof I affix my signature in presence of two witnesses.

JACOB P. IMIG.

Witnesses:
H. H. VAN LORAM,
BERT SHAWGO.